United States Patent [19]

Vandling

[11] 4,055,729
[45] Oct. 25, 1977

[54] APPARATUS FOR THE DIRECT CONNECTION OF ANCILLARY EQUIPMENT TO A TELEPHONE NETWORK

[75] Inventor: John M. Vandling, Pleasantville, N.Y.

[73] Assignee: Exxon Research & Engineering Co., Linden, N.J.

[21] Appl. No.: 689,263

[22] Filed: May 24, 1976

[51] Int. Cl.² .................. H04M 1/00; H04M 9/00
[52] U.S. Cl. .................... 179/2 C; 178/2 R; 179/2 DP
[58] Field of Search .......... 179/2 R, 2 C, 2 DP, 179/2 A, 3, 4, 1 C; 178/2, 3 R, 4.1 R

[56] References Cited

U.S. PATENT DOCUMENTS

| | | | |
|---|---|---|---|
| 3,475,557 | 10/1969 | Morse et al. | 179/2 DP |
| 3,822,364 | 7/1974 | Lee | 179/2 C |
| 3,876,837 | 4/1975 | Gormley et al. | 179/2 C |
| 3,962,546 | 6/1976 | Hashimoto | 179/2 DP |

*Primary Examiner*—Thomas A. Robinson
*Attorney, Agent, or Firm*—Norman L. Norris

[57] ABSTRACT

Ancillary equipment including a facsimile transceiver is directly connected to a telephone network through a coupling arrangement. The coupling arrangement includes a transfer relay for transferring the primary communication path to the telephone network between a telephone station set and the ancillary equipment. The transfer between the telephone station set and the ancillary equipment is controlled by a sensor which electrically senses a change from the off-hook to the on-hook state of the telephone set. The transfer is also controlled in response to the state of the ancillary equipment. The coupling arrangement also limits the signal power level coupled into the telephone network from the ancillary equipment.

45 Claims, 3 Drawing Figures

APPARATUS FOR THE DIRECT CONNECTION OF ANCILLARY EQUIPMENT TO A TELEPHONE NETWORK

BACKGROUND OF THE INVENTION

This invention relates to the direct connection of ancillary equipment such as fascimile transceivers to the telephone network.

In many instances, it is necessary for various types of ancillary equipment including data terminals and facsimile transceivers to be directly connected to the switched telephone network, as contrasted with acoustic coupling, in order to satisfy certain wide band communication channel requirements. Heretofore, the telephone companies have offered various protective interface devices so as to permit the direct connection of ancillary equipment to the telephone network without any risk of harm to the network. Recently, the FCC has promulgated rules which will permit the direct connection of ancillary equipment to the telephone network without the use of the protective devices offered by the telephone companies if ancillary equipment or associated protective cicuitry satisfies certain requirements which are the subject of an FCC registration program.

The direct connection of ancillary equipment subject to the FCC rules will present a number of problems to the users of this ancillary equipment who wish to avoid, to the extent possible, the use of telephone company supplied equipment. For example, the network protective devices presently offered by the telephone company, commonly referred to as DAA (direct access arrangements), are typically supplied in conjunction with a telephone station set having an exclusion key. The exclusion key which is associated with the cradle of the telephone set is provided to assure that return of the telephone handset to the cradle will break the telephone line connection thus excluding the ancillary equipment from connection to the telephone network and thereby assuring that the telephone set will be prepared to receive the next incoming call. In the absence of such exclusion key, it is possible to maintain a telephone line connection even though the handset is returned to the cradle if one should forget to turn the data access arrangement off so as to break the telephone line connection. On the other hand, it is desirable to utilize certain telephone company supply equipment such as, for example, a "500" type telephone set in conjunction with the ancillary equipment so as to provide a voice communication and dialing capability. Thus it is desirable to provide the exclusion function normally provided by the exclusion key in conjunction with the standard telephone set without such an exclusion key while at the same time maintaining the necessary isolation of the telephone network from the ancillary equipment.

Pori U.S. Pat. No. 3,886,314 discloses the direct connection of ancillary equipment and a telephone handset to the telephone network through an exclusion unit and coupler. The nature of the exclusion unit and coupler is not disclosed. Lee U.S. Pat. No. 3,822,364 and Gonsewski et al U.S. Pat. No. 3,524,935 disclose the connection of telephone station sets and ancillary equipment to the telephone network through coupling circuitry. Both patents disclose mode selection arrangements for the transfer of the primary communication connection from the telephone set to the ancillary equipment.

SUMMARY OF THE INVENTION

It is one object of this invention to provide apparatus for directly connecting ancillary equipment to the telephone network having an exclusion function not associated with the telephone handset.

In accordance with this object, a preferred embodiment of the invention comprises coupling means adapted to directly connect the telephone network to the ancillary equipment. Transfer means are associated with the coupling means for transferring the primary communication connection of the telephone network from the telephone station set to the ancillary equipment. Sensor means are electrically connected to the telephone set when a primary communication connection is between the telephone network and the ancillary equipment. The sensor means is responsive to an electrical signal from the telephone station set so as to sense a change from the off-hook to the on-hook state of the telephone set and subsequently transfer the primary communication connection of the telephone network from the ancillary equipment to the telephone station set.

In further accordance with this object of the invention, transfer control means are coupled to the ancillary equipment for transferring the primary communication connection of the telephone network between the ancillary equipment and the telephone set in response to the state of the ancillary equipment. The transfer control means may be adapted to transfer the primary communication from the telephone station set to the ancillary equipment when the ancillary equipment is in an operable state as long as the telephone station set is off-hook and transfer the primary communication connection from the ancillary equipment back to the telephone station set when the ancillary equipment is in an inoperable stae or when the telephone station set is placed back on hook.

In a particularly preferred embodiment of the invention, the ancillary equipment comprises a facsimile unit including a rotatable drum, a housing having an opening providing communication with the rotatable drum located within, and a closure means covering the opening. The inoperable state corresponds to a position of the closure means exposing the opening and the operable state corresponds with a position of the closure means covering the opening.

In accordance with another important aspect of the invention, the coupling means establishes a secondary communication connection to the telephone station set and the sensor means while the primary communication connection is established between the ancillary equipment and the telephone network. The secondary communication connection permits the monitoring of a transmission to or from the ancillary equipment through the use of the telephone station set.

In accordance with another important aspect of the invention, the sensor means comprises means for maintaining isolation between the telephone network and the transfer control means. In a particularly preferred embodiment of the invention, the sensor means comprises opto-isolation means including a light-emitting diode in series with the telephone set and a phototransistor coupled to the transfer means.

In accordance with still another important aspect of the invention, the coupling means comprises means for limiting the signal power levels transmitted from the ancillary equipment without limiting signals transmitted from the telephone station set.

In accordance with yet another important aspect of the invention, the coupling means comprises first means including a plug having connecting means and a jack having connecting means adapted to be coupled to other connecting means of a type substantially identical with the plug connecting means. The first means is connected to either the telephone station set or the ancillary equipment. Second means having plug connecting means adapted to be coupled to the jack is connected to the telephone station if the first means is connected to the ancillary equipment or is connected to the ancillary equipment if the first means is connected to the telephone station set.

In accordance with a still further aspect of the invention, means are associated with the jack for sensing the presence or absence of the plug connecting means of the second means and enabling the transfer control means in the absence of the second means so as to establish the primary communication connection with the telephone station set or the ancillary equipment connected to the first means.

DETAILED DESCRIPTION OF A PREFERRED EMBODIMENT

Figure 1:
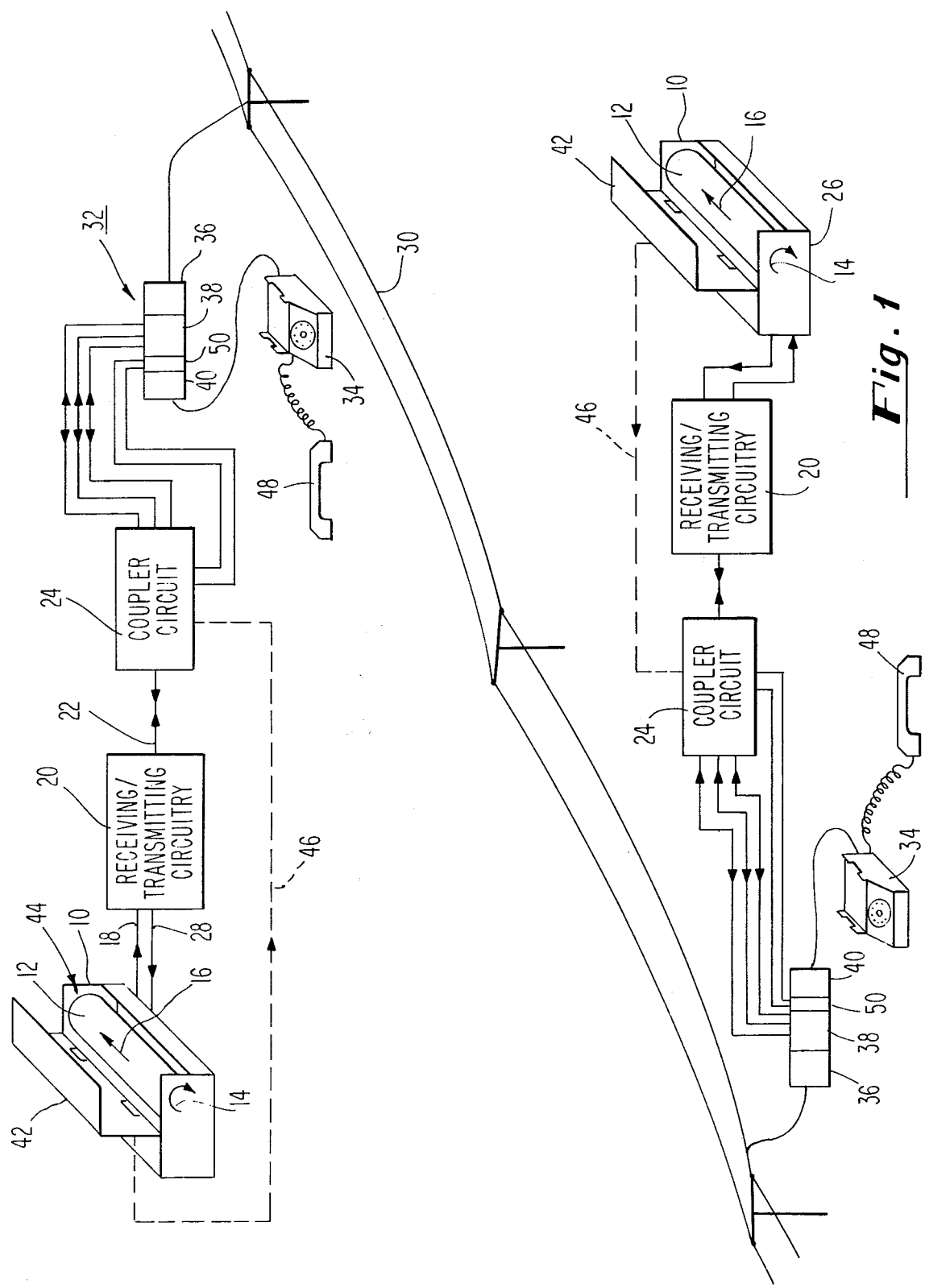
FIG. 1 is a pictorial/schematic diagram of a telephone communication system embodying the invention.

Referring now to the system shown in FIG. 1, ancillary equipment in the for of a facsimile transceiver 10 comprises a drum 12 rotated by a motor not shown in a direction depicted by an arrow 14 so as to create a relative scanning movement between a document or copy medium carried by the drum 12 and a scanning head not shown. If the scanning head is advanced axially along the drum 12 as indicated by an arrow 16 and the drum rotates about its axis as indicated by the arrow 14, successive paths on the document or copy medium are placed in communication with suitable transducers carried by the head.

When the transceiver 10 is operating in a transmit mode, the reading transducer such as a photodetector carried by the head detects variations in light intensity due to the reflectivity of the document as the document is scanned by the photodetector. The output from the photodetector is converted into a modulated transmisson signal at the output as depicted by line 18 and then applied to the receiving/transmitting circuitry 20. The output from the receiving/transmitting circuitry 20 as depicted by line 22 is then applied to coupler 24.

When the transceiver 10 is operated in a receiving mode, the signals from the coupler 24 are applied at the input 22 to the receiving/transmitting circuitry. The output 28 of the receiving/transmitting circuitry is then applied to the writing transducer such as a stylus carried by the head in the transceiver 10 so as to mark on the copy medium carried by the drum 12.

The coupler circuit 24 is connected to the telephone network including lines 30 through a piggyback plug-jack arrangement 32 which also permits connection of a telephone 34 to the network. More specifically, the combination 32 includes a standard telephone jack 36 connected directly to the network, a plug-jack 38 hard-wired to the coupler 24 and a plug 40 hard-wired to the telephone set 34.

In accordance with one very important aspect of the invention, the coupler circuit 24 provides a transfer function for alternately establishing a primary communication path between the telephone set 34 and the telephone network or between the facsimile transceiver 10 and the telephone network. Transfer is made responsive to the state of the facsimile transceiver 10 as indicated by the position of a cover 42 which provides a closure for the opening 44 through which the drum 12 is accessible for changing of a copy medium or document. When the cover 42 is open as shown in FIG. 1, a mechanical linkage 46 connecting the coupler circuit 24 with the transceiver 10 transfers the primary communications path to the telephone set 34. When the cover 42 is closed, the primary communications path is transferred back to the facsimile transceiver 10 assuming that the telephone set 34 remains off-hook as shown.

In addition to the transfer function and in accordance with another important aspect of the invention, the coupler circuit 24 also provides an exclusion function which automatically breaks the primary communications path with the facsimile transceiver 10 when the handpiece 48 of the telephone set 34 is placed on-hook even if the cover 42 is closed. This assures that a telephone line will not accidentally be left off-hook at the conclusion of a facsimile transmission even though the handpiece 48 of the telephone set 34 has been placed on-hook. In addition, the exclusion function resets the coupler circuit 24 so as to prepare the telephone set 34 to receive the next incoming call regardless of the on or off condition of the facsimile transceiver.

In order to permit the use of the coupler circuit 24 without the handset 34, means are provided for deactivating the exclusion function. This is accomplished by means of a switch associated with a rotatable cover plate 50 which alternately covers or exposes the receptacles of the jack portion in the plug-jack 38.

As shown in FIG. 1, another facsimile transceiver 10 and another telephone set 34 is connected to the line 30 of the network by a similar plug-jack combination 32, an associated coupler circuit 24 and receiving/transmitter circuitry 20. It will of course be understood that facsimile transmissions are made from one facsimile transceiver to the other with either transceiver capable of operating in the receiving or transmitting mode.

Figure 3:
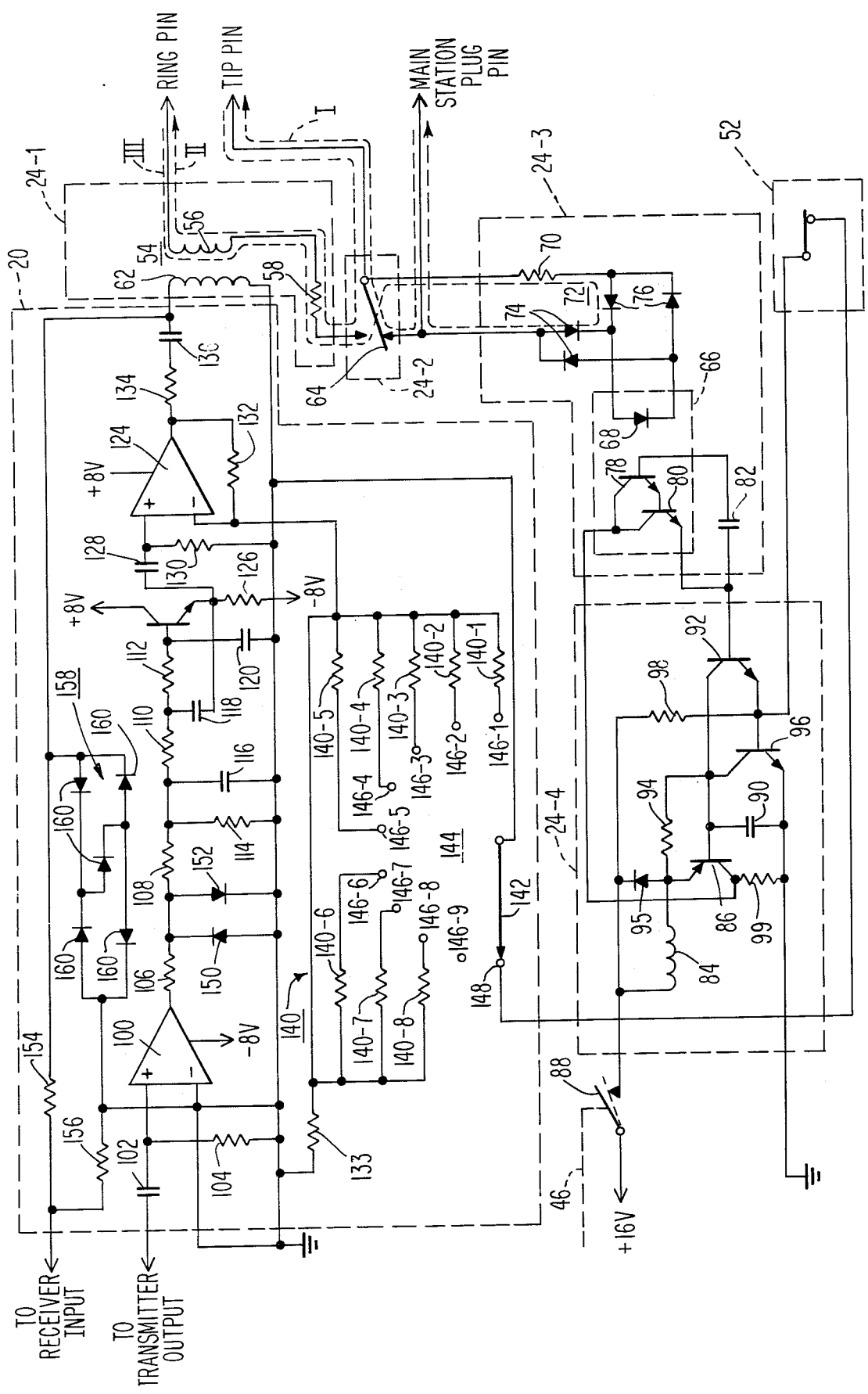
FIG. 3 is a schematic diagram of the coupler shown in block diagram form in FIG. 1.

Reference will now be made to FIG. 3 in which the receiving/transmitting circuitry 20 and the coupler circuit 24 are shown in detail. For purposes of explanation, the coupler circuit 24 has been partitioned off into a coupling portion 24-1, a transfer portion 24-2, a sensor portion 24-3, and a transfer control portion 24-4. In addition, FIG. 3 illustrates an exclusion activating or deactivating switch 52 associated with the rotatable cover plate 50 shown in FIG. 1 which disables or enables the transfer control portion 24-4.

The coupling portion 24-1 of the coupler circuit 24 comprises a transformer 54 which isolates the facsimile transceiver 10 from the telephone network. One winding 56 to the transformer 54 is connected in series with a resistor 58 and a ring terminal of the plug-jack combination 38 shown in FIG. 1. The other winding 62 is connected to the receiving/transmitting circuitry 20 which is associated with the facsimile transceiver and will be subsequently described in detail. The transformer 54 serves to couple received and transmitted signals between the telephone network and the receiving/transmitting circuitry 20 associated with the facsimile transceiver 10 shown in FIG. 1.

The transfer portion 24-2 of the coupler circuit 24 which provides the exclusion feature comprises a relay 64 which is shown in the de-energized position which establishes a primary communication connection or path between the telephone set 34 and the telephone network. When the relay 64 is in the energized position not shown, the facsmile transceiver 10 of FIG. 1 is in the primary communications path to the telephone network through the transformer 54.

The sensor portion 24-3 of the coupler circuit 24 comprises an opto-isolator arrangement 66 which includes an LED (light emitting diode) 68 which is connected in series with a current limiting resistor 70 and a diode bridge 72 which protects against polarity reversal thus assuring that the correct polarity current is always available to the LED 68. The diode bridge includes individual diodes 74 which are directly connected to the relay 64 and diodes 76 which are directly connected to the current limiting resistor 70.

The opto-isolator 66 also includes a photo-transistor 78 connected in a Darlington configuration with a transistor 80. The photo-transistor 78 is exposed to the light emitting diode 68 so as to render the transistor 78 as well as the transistor 80 conductive when the diode is emitting light. A capacitor 82 is connected between the emitter of the transistor 80 and the base of the transistor 78 so as to shunt the base to LED capacitance of the transistor 78 and the LED 68.

From the foregoing, it should be clear that the photo-transistor 78 and the transistor 80 will only be conductive when the relay 64 is in the energized position and the telephone set is off-hook. With the relay 64 de-energized as shown, the current path through the LED 68 is short circuited so as to prevent the emission of any light from the LED 68 and the conduction of the transistors 78 and 80. Therefore, the diode 68 will only emit light, and the transistors 78 and, 80 will only be conductive, when the relay 64 is in the energized position and a telephone set 34 as shown in FIG. 1 is off-hook so as to permit current flow between the tip and ring terminals and through the light emitting diode 68. Thus, the opto-isolator circuit arrangement 66 serves to sense changes in the magnitude of current flow when the telephone is placed in the on-hook position at the conclusion of a facsimile transmission, during which the relay 64 has been in the energized position s as to place the facsimile transceiver 10 in the primary communication path or connection with the telephone network while the telephone was off-hook.

The control of the relay 64 between the energized and de-energized position in response to the transfer control portion 24-4 of the coupler circuit 24 will now be discussed. As shown in FIG. 3, current flow through a relay coil 84 is controlled by a transistor 86 having a collector connected to ground through a resistor 99 so as to act as a saturated switch. When the telephone set is off-hook and a switch 88 associated with the +16 volt power supply is open as shown, the transistor 86 is nonconductive and no current flows through the coil 84. As a consequence, the contacts of the relay 64 remain in the de-energized position as shown in FIG. 3.

However, closure of the switch 88 so as to apply a +16 volts to the transfer control portion 24-4 will supply a momentary turn-on bias to the transistor 86 from a capacitor 90 as the capacitor charges so as to allow current to flow through the relay coil 84 and thereby move the contacts of the relay 64 to the energized position. At this time, assuming the handpiece 48 is off-hook, the diode 68 begins to emit light and the transistors 78 and 80 begin to conduct so as to apply a base current to the transistor 92 of the transfer control portion 24-4. The transistor 92 now provides the necessary base current for the transistor 86 after the capacitor 90 is charged. It is therefore understood that the capacitor 90 merely supplies the turn-on bias for the transistor 86 while the contacts of the relay 64 are changing from the de-energized to the energized state. A diode 95 is connected across the coil 84 to dissipate the stored energy in the coil and thereby protect the transistor 86 when the transistor becomes nonconductive.

If the telephone handpiece 48 of the telephone set 34 is now placed on-hook, the current flow through the LED 68 is interrupted, and the transistors 78 and 80 become nonconductive. As a consequence, the transistor 92 becomes nonconductive which in turn affects conduction through the transistor 86 and the coil 84 so as to move the contacts of the relay 64 to the deenergized state as shown in FIG. 3. The exclusion function is therefore performed by sensing the on-hook/off-hook state of the telephone set and assuring that the coupler circuit returns the telephone set to the normal state wherein the primary communications path is re-established between the telephone set and the telephone network in preparation for the next call. In other words, the primary communications path is re-established such that the telephone set when off-hook is connected to the telephone network and the telephone set when on-hook is ready to be connected to the telephone network as soon as the handpiece 48 is removed from its cradle on the telephone set.

As shown in FIG. 3, the switch 88 which is coupled to the mechanical linkage 46 shown in FIG. 1 is responsive to the state of the facsimile transceiver 10, i.e., the open cover state or the closed cover state. When the cover 42 of the transceiver is open, the switch 88 is in the open position as shown in FIG. 3 so as to disconnect the +16 volt power supply from the relay coil 84. When the cover 42 of FIG. 1 is closed, the switch 88 is closed thus connecting the +16 volt power supply directly to the coil 84.

When the switch 88 is closed and the contacts of the relay 64 are in the energized state as discussed previously, the facsimile transceiver 10 is ready for transmission over the lines 30 of the telephone network. If the switch 88 is opened in response to the opening of the cover 42 as shown in FIG. 1, the energized relay will be returned to the de-energized state and the capacitor 90 will be discharged through resistors 94 and 98 associated with the transistors 86 and 96. To return the relay 64 to the energized state while the telephone handpiece 48 remains off-hook, one need only close the cover 42 so as to close the switch 88 and again apply momentary turn-on bias to the transistor 86 by means of the charging capacitor 90.

If the telephone handpiece 48 is placed on-hook so as to return the relay to the de-energized state with the resultant charging of the capacitor 90 and it is desirable to reinitiate a facsimile transmission, the telephone handset 48 need only be taken off-hook. The cover 42 of the transceiver 10 as shown in FIG. 1 may then be opened so as to open the switch 88 of FIG. 3 and allow the capacitor 90 to discharge through the resistors 94 and 98. The cover 42 as shown in FIG. 1 may then be closed so as to close the switch 88 thereby allowing the capacitor 90 to charge and provide the transistor 86 with the initial turn-on bias and the relay coil 84 with the initial current for returning the contacts of the relay 64 to the energized state.

In the foregoing discussion it has been assumed that the switch 52 associated with the cover 50 shown in FIG. 1 is closed. With the switch 52 closed, the coupler is capable of operating in the exclusion mode described above. However, opening of the switch 52 by removing the plug 40 of the telephone set 34 from the jack of the plug-jack combination 38 will permit the facsimile transceiver 10 to be coupled to the telephone network without an exclusion feature.

In this connection, it will be noted that the transfer control portion 24-4 of the coupler circuit 24 includes another transistor 96 having its base connected through a resistor 98 to the +16 volt supply. With the swtich 52 open, the base of the transistor 96 is not clamped to ground. Rather, the base is connected to the +16 volt power supply through the resistor 98 when the switch 88 associated with the cover 42 as shown in FIG. 1 is closed. By opening the switch 52 to the position not shown, the exclusion function is eliminated, the transfer control means is energized, and the relay will assume the energized state whenever the switch 88 associated with the cover 42 is closed. Closing of the switch 52 will again ground the base of the transistor 96 so as to return control of the relay 64 to the transistor 92. In either case, the transistor 92 and the transistor 96 serve to control the transistor 86 which operates as a saturated switch in series with the relay coil 84.

It should be understood that the coupler circuit shown in FIG. 3 is capable of operating in conjunction with a telephone company supplied DAA when the circuit including the switch 52 is left open by selecting any appropriate position on the switch 144 other than the position 148. For this purpose, the tip terminal and the ring terminal shown in FIG. 3 may be connected directly to the DAA. Of course, there would be no exclusion mode provided by the coupler circuit in that event unless that exclusion function could be provided by the typical telephone company installed exclusion key.

In accordance with another important aspect of the invention, the coupler circuit 24 inclues means by which a secondary communication connection or path is established between the facsimile transceiver and the telephone station set. In this regard, the total DC resistance of the transformer secondary 56 and the resistor 58 are carefully chosen so as to provide a DC supervisory current in the lines 30 of FIG. 1. This current then causes a potential of approximately 5 volts DC to appear across the open contacts of the relay 64 when in its energized stage, and it is this potential, which is applied via the current and side tone limiting resistor 70, which appears across the LED 68 and will maintain the relay 64 in the energized state. Note that the resistor 70 serves to limit the DC current flowing through the LED 68 to a value sufficient to cause conduction in the photo-transistor 78 while at the same time providing a sufficient AC current flow in the telephone set 34 to insure a low level side tone for monitoring purposes without injecting ambient noise into the facsimile communication channel.

The receiving/transmitting circuitry 20 will now be described in detail with reference to FIG. 3. When the transceiver 10 shown in FIG. 1 operating in the transmitting mode, the output from the transmitting circuitry is coupled to the non-inverting input terminal of operational amplifier 100 through a decoupling capacitor 102 and biasing resistor 104. The function of the operational amplifier 100 and diodes 150 and 152 is to accept signal levels over a wide range of amplitudes and clip those signals so as to generate a square wave output of substantially constant amplitude. The output from the operational amplifier 100 is then applied to a low pass filter including resistors 108, 110, 112, and 114, and capacitors 116, 118 and 120. A pair of oppositely poled amplitude reference diodes 150 and 152 are connected between ground and the junction of resistors 106 and 108.

A transistor 122 is connected to the output of the low pass filter at the input to a second operational amplifier 124. The collector of the transistor 122 is connected to a +8 volt power supply while the emitter is connected to a −8 volt power supply through a resistor 126. The transistor 122 provides a high impedance amplifier with a gain of 1 so as not to load the low pass filter. The output from the emitter of the transistor 122 is coupled to the non-inverting terminal of the operational amplifier 124 by way of a coupling network including a capacitor 128 and a resistor 130.

In accordance with one important aspect of the invention, the power of the transmitted facsimile signal is limited so as to assure that the signal level coupled to the telephone network will not exceed a specified limit associated with a specific DAA or, in the absence of a DAA, limit the transmitted signal to a level which will not exceed the existing tariffs. The signal power level is in part established by a negative feedback resistor 132 connected between the output and the inverting terminal of the operational amplifier 124. A resistor 134 connected in series with a capacitor 136 serves to establish the proper drive impedance of approximately 600 ohms in the frequency range of 500 to 3000 Hz. An adjustable resistive network 140 and a resistor 133 serves, in conjunction with the resistor 132, to establish the voltage level applied to the winding 62 of the transformer 54 which is coupled to the telephone network.

The resistive network 140 includes a plurality of resistors 140-1 through 140-8 which establish fixed power levels of −1 through −9db with respect to one milliwatt. When a movable contact 142 of a switch 144 establishes contact with stationary contacts 146-1 through 146-8, the resistance of one particular resistor 140-1 through 140-8, is connected in series with the resistor 132 and in parallel with a resistor 133 so as to adjust the negative feedback of the amplifier 124 to establish a desired signal power level for use with a DAA of the telephone company. When the movable contact 142 is in contact with the stationary conact 146-9, only the resistor 133 is connected in a negative feedback loop of the operational amplifier 124 so as to produce a −9dbm level. Similarly, when the movable contact 142 is in contact with a stationary contact 148, the only resistance in the negative feedback loop is the resistor 132 and 133 and the signal power level is again established at a −9dbm level. The −9dbm level has been chosen so as to assure that the power level does not exceed the presently permissible levels associated with acoustic couplers.

It will be understood that the signal power levels established by the resistive network 140, the resistor 132, and the resistor 133 apply only to the output signals of the facsimile transceiver. The signal power levels transmitted from the telephone set 34 as shown in FIG.

1 are not at all affected by the receiving/transmitting circuitry signal power level control means.

When the facsimile transceiver 10 shown in FIG. 1 is operated in a receiving mode, the transceiver 10 receives signals across the winding 62 of the transformer 54. The signals are then applied to the facsimile transceiver through a resistor 154 connected in parallel with a resistor 156 and a diode clamping network 158 including diodes 160. The clamping network 158 is effective to clamp excessively large signals which are applied to the receiving/transmitting circuitry 20 and to limit fault signal levels to approximately 0 dbm in the event of transmitting circuit component failure.

As mentioned previously, the state of the switch 52 is under the control of the plug cover 50 which will now be described in more detail with reference to FIG. 2. As shown therein, the cover 50 includes a plurality of openings 252 which extend from one side to the other side of the cover 50. In the position shown, one connector with connecting means of one type in the form of openings 252 are in a state of nonalignment with the connecting receptacles or female terminals 254 of the plug-jack connector 38. As a consequence, the connector with connecting means of another type in the form of connecting prongs or male terminal members 256 of the plug 40 cannot be mated with i.e., inserted into, the female terminals 254 of the plug-jack combination 38. In other words, the position of the cover plate 50 shown in FIG. 2 prevents the connection of the telephone 34 to the telephone line through the plug-jack combination 38. Accordingly, the switch 52 which is shown in FIG. 1 is in the open position since the cam control member 258 is not in contact with the switching member 260 of the switch 52.

When the cover 50 is rotated such that the openings 252 are aligned with the receptacles 254, the prongs 256 may be inserted into the receptacles 254. This rotation of the cover 50 will move the cam member 258 into a position with respect to the movable contact member 260 so as to close the switch 52 thereby activating the circuitry of the electronic exclusion feature.

The plug-jack combination 38 also includes a connector having connecting means of the type including connecting prongs or male terminal members 262 which are adapted to be received by a connector having connecting means of the type including the female terminal members or connecting receptacles 264 of the jack 36. Also shown in FIG. 2 are the hard-wired connections to the main station pin, the ring pin and the tip pin of the coupler shown in FIG. 3.

Figure 2:
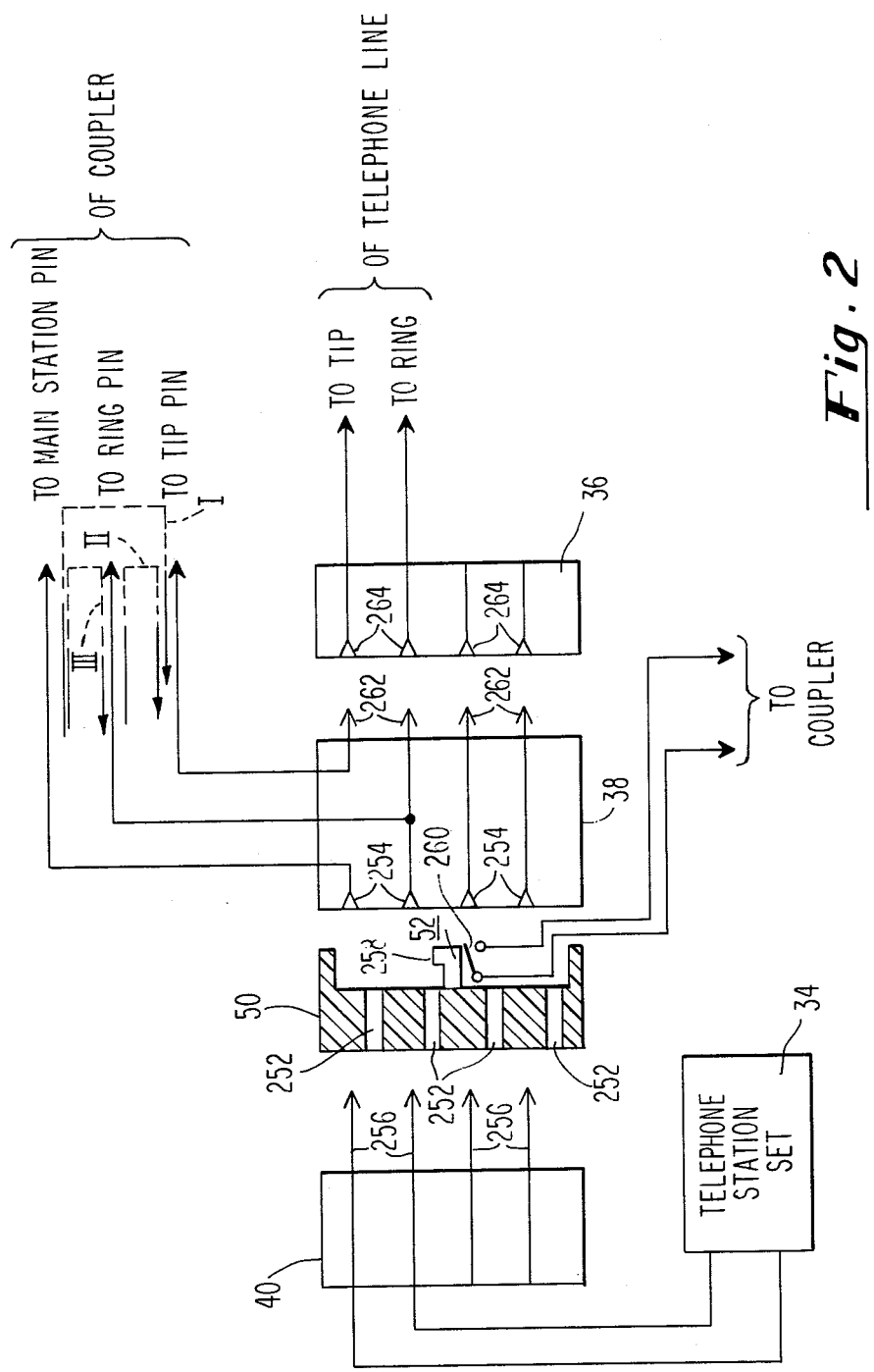
FIG. 2 is a schematic diagram illustrating the connecting mechanism of FIG. 1.

From the foregoing, it will be understood that there are essentially three signal current or communications paths which are established by the circuitry of FIGS. 2 and 3. As shown in FIG. 2, a first current path I extends between the tip and ring terminals of the jack 36 and through the bridged telephone station set 34. A second current path II extends between the tip and ring terminals of the jack 36 as shown in FIG. 2 and through the winding 56, the resistor 58, the contact 64 of the relay 84 and the tip pin of the coupler as shown in FIG. 3. The third current path III extends between the tip and ring terminals of the jack 36 as shown in FIG. 2 and through the telephone set 34, the resistor 70, the diode network 72 and the LED 68 shown in FIG. 3. The third current path III is the seconary communications path which permits the side/tone monitoring of the telephone line during a facsimile transmission period while connected in series.

The following are values of the components shown in the receiving/transmitting circuitry 20 and the coupler circuit 24:

| | | |
|---|---|---|
| R58-51Ω | R140-8-18K | OP AMP 100-MC 1453 |
| R70-5.1KΩ | R154-2KΩ | OP AMP 124-MC 1458 |
| R94-10KΩ | C82-220pf. | |
| R98-10KΩ | C90-6.8μf | |
| R99-240Ω | C102-.01μf | |
| R104-20KΩ | C116-.025μf | |
| R106-10KΩ | C118-.1μf | |
| R108-24KΩ | C120-500pf. | |
| R110-7.5KΩ | C136-.01μf | |
| R112-10KΩ | D74-1N914 | |
| R114-12KΩ | D76-1N914 | |
| R126-10KΩ | D95-GE509 | |
| R130-20KΩ | D150-1N914 | |
| R132-30KΩ | D152-1N914 | |
| R134-560Ω | D160-GE509 | |
| R140-1-1.3KΩ | Q78) | |
| R140-2-1.6KΩ | Q80) [-MCA-230] | |
| R140-3-2.7KΩ | LED68) | |
| R140-4-2.5KΩ | Q86-2N4402 | |
| R140-5-3.1KΩ | Q96-2N4401 | |
| R140-6-5.1KΩ | Q122-2N4401 | |
| R140-7-9.1KΩ | | |

Although the specific ancillary equipment described in the foregoing is a facsimile transceiver, it will be understood that the receiving/transmitting circuit 20 and the coupler circuit 24 are adapted for use with other types of ancillary equipment. For example, the receiving/transmitting circuitry 20 and the coupler cicuit 24 in conjunction with the plug and jack combination may be utilized with voice/data terminals wherein it is desirable to directly connect the ancillary equipment to the telephone network.

Although the facsimile transceiver 10 has not been shown and described in detail, it will be understood that facsimile transceivers in various forms may be utilized. For example, the facsimile transceivers incorporating facsimile transmitting and receiving circuitry disclosed in application Ser. No. 606,507 filed Aug. 21, 1975 and application Ser. No. 606,506 filed Aug. 21, 1975 may be utilized, both of which are incorporated herein by reference.

It will also be understood that, although specific plugs and jacks have been shown and described in detail, other connecting means may be utilized including but not limited to the various plugs and jacks which have been proposed, as part of the aforesaid FCC regulations.

It will therefore be understood that although a specific embodiment of the invention has been shown and described in detail, other embodiments and modifications which will occur to those of ordinary skill in the art also fall within the true spirit and scope of the invention as set forth in the appended claims.

What is claimed is:

1. Apparatus for direct coupling ancillary equipment to a telephone network in conjunction with a telephone station set comprising:
    coupling means adapted to directly connect said telephone network to said ancillary equipment;
    transfer means associated with said coupling means for transferring the primary communication connection of said telephone network from said telephone station set to said ancillary equipment;
    sensor means electrically connected to said telephone set when a primary communication connection is between said telephone network and said ancillary equipment, said sensor means being responsive to an electrical signal from said telephone station set to sense a change from the off-hook to the on-hook stage of said telephone set; and transfer control means coupled to said sensor means and said transfer means for transferring the primary communication connection of said telephone network from said ancillary equipment to said telephone station set when said sensor means senses a change from the off-hook to the on-hook state of said telephone set.

2. The apparatus of claim 1 wherein said transfer control means is also coupled to said ancillary equipment for transferring the primary communication connection of said telephone network between said ancillary equipment and said telephone set in response to the state of the ancillary equipment.

3. The apparatus of claim 2 wherein said transfer control means is adapted to transfer said primary communication connection from said telephone station set to said ancillary equipment when said ancillary equipment is in an operable state as long asthe telephone station set is off-hook and transfer said primary connection from said ancillary equipment back to said telephone station set when said ancillary equipment is in an inoperable state.

4. The apparatus of claim 3 wherein said ancillary equipment comprises a facsimile unit including a rotatable drum, a housing having an opening providing communication with said rotatable drum located within and a closure means covering said opening, said inoperable state corresponding to a position of said closure means exposing said opening and said operable state corresponding with a position of said closure means covering said opening.

5. The apparatus of claim 2 wherein said transfer control means comprises means for deactivating the function of said control means which transfers said primary communication connection of said telephone network from said telephone station set to said ancillary equipment when said telephone station set is in the on-hook state.

6. The apparatus of claim 1 wherein said sensor means is connected to said telephone station set and said telephone network while said primary communication connection is established between said ancillary equipment and said telephone network.

7. The apparatus of claim 6 wherein said connection of said telephone station set and said telephone network with said sensor means establishes a secondary communication path with said telephone network through said telephone station set while said primary communication connection is established between said ancillary equipment and said telephone network.

8. The apparatus of claim 6 wherein said sensor means senses the flow of current through said telephone station set.

9. The apparatus of claim 1 wherein said transfer means comprises a relay having first and second positions, said first position establishing said primary communications connection between said telephone network and said telephone station set and said second position establising said primary communications connection between said telephone network and said ancillary equipment.

10. The apparatus of claim 9 wherein said transfer control means comprises control circuitry for moving said relay between said first position and said second position, said control circuitry including means for momentarily moving said relay from said first position to said second position in response to one state of said ancillary equipment before said sensor means senses current flow through said sensor means and said telephone station set and means for maintaining said relay means in said second position after said sensor means senses current flow through said sensor means and said telephone station set, said means for maintaining said relay in said second position being deactivated in response to the interruption of current flow through said sensor means and said telephone station set when said telephone station set is returned to the on-hook state.

11. The apparatus of claim 1 wherein said sensor means comprises means for maintaining isolation between said telephone network and said transfer control means 12. The apparatus of claim 11 wherein said sensor means comprises opto-isolation means including a light emitting diode in series with said telephone set.

13. The apparatus of claim 12 further comprising current limiting means connected in series with said telephone set and said light emitting diode 14. The apparatus of claim 13 wherein said current limiting means also limits the signal power level.

15. The apparatus of claim 11 further comprising polarity reversal protection circuitry associated with said isolation means.

16. The apparatus of claim 15 wherein said coupling means comprises a first pair of terminals adapted to make contact with network terminals associated with said telephone network and a second pair of terminals adapted to make contact with said terminals associated with said telephone station set, said coupling means including means for completing a first current flow path between said first pair of terminals through said telephone station set when said transfer means is in a first state, means for completing a second current flow path through said first pair of terminals and said ancillary equipment when said transfer means is in a second state and means for completing a third current flow path through said second pair of terminals, said telephone station set and said sensor means when said transfer means is in said second state.

17. The apparatus of claim 1 including means for enabling said transfer control means in the absence of a telephone station set.

18. The apparatus of claim 17 wherein said coupling means comprises a first pair of terminals adapted to make contact with network terminals associated with said telephone network and a second pair of terminals adapted to make contact with said terminals associated with said telephone station set, said coupling means including means for completing a first current flow path between said first pair of terminals through said telephone station set when said transfer means is in a first state, means for completing a second current flow path through said first pair of terminals and said ancillary equipment when said transfer means is in a second state and means for completing a third current flow path through said second pair of terminals, said telephone station set and said sensor means when said transfer means is in said second state.

19. The apparatus of claim 18 wherein said enabling means comprises cover means covering said second set of terminals, said cover means adapted to be moved between a first position covering said second set of terminals and a second position exposing said second set of terminals to contact with said station set terminals, said cover means enabling said transfer control means when said cover means is in said second position.

20. Apparatus for direct coupling a telephone set and ancillary equipment to a telephone network comprising:
first circuit means providing a first communication current path through said telephone set and said network;
second circuit means providing a second communication current path through said ancillary equipment and said network;
third circuit means providing a third control current path through said telephone set and said network simultaneously with said second communication current path;
control means for selectively completing said first current flow path or said second current flow path; and
sensor means for sensing the magnitude of current flow in said third current flow path;
said control means being responsive to said sensor means so as to selectively complete said first current flow path and break said second current flow path in response to sensing said open circuit in said third current flow path.

21. Apparatus for providing a combination voice/facsimile capability over the telephone network comprising:
a discrete facsimile unit for use in transmitting and/or receiving signals representing the information content of a document;
a discrete vice communication unit for use in transmitting and/or receiving voice signals;
a first plug including male connecting means;
a jack including connecting means adapted to receive male connecting means of a type substantially identical with said male connecting means of said plug, said jack being connected to said plug and one of said discrete units;
one of said discrete units including a second plug including connecting means adapted to be coupled into said jack; and
transfer means connected to said first plug and said second plug for transferring the primary communication connection of said telephone network from one to the other of said discrete units.

22. The apparatus of claim 21 wherein said second plug is connected to said voice communication unit.

23. The apparatus of claim 21 wherein said transfer means is coupled to said facsimile unit for transferring the primary communication connection from said voice communication unit to said facsimile unit in response to the state of said facsimile unit.

24. The apparatus of claim 21 wherein said transfer means is coupled to said voice communication unit for transferring the primary communication connection from said facsimile unit to said voice communication unit in response to the state of said voice communication unit.

25. Apparatus for combining a combination/voice/facsimile capability comprising:
facsimile means for generating signals representing dark/light variations in a document;
voice communication means for generating signals representing speech patterns; and
joint coupling means connected to said facsimile means and said voice communication means for directly connecting said facsimile and said voice communication means to a telephone network;
said coupling means including power signal level limiting means for limiting the power of said signals representing dark/light variations in a document without limiting said signals representing speech patterns generated by said voice communication means.

26. The apparatus of claim 25 wheren said coupling means comprises transfer means for transferring the primary communication connection of said telephone network between said facsimile means and said voice communication means.

27. The apparatus of claim 26 wherein said transfer control means is coupled to said facsimile unit for transferring the primary communication connection from said voice communication means to said facsimile means in response to the state of said facsimile means.

28. The apparatus of claim 26 wherein said transfer control means is coupled to said facsimile means for transferring the primary communication connection from said facsimile means to said voice communication means to response to the state of the said facsimile unit.

29. The apparatus of claim 26 comprising transfer control means coupled to said voice communication means for transferring the primary communication connection from said facsimile means to said voice communication means in response to the state of said voice communication means.

30. A system for providing a combination voice/ancillary equipment capability over the telephone network comprising:
ancillary equipment communication apparatus for use in transmitting and/or receiving ancillary signals;
voice communication apparatus for use in transmitting and/or receiving voice signals;
plug/jack connector means including
a first connector having a first type of connecting means;
a second connector having a second type of connecting means adapted to mate with connection means of said first type, said second connector being coupled to said first connector and one of said communication apparatus;
a third connector having said first type of connecting means and adapted to mate with said second connector, said third connector being connected to the other of said communication apparatus; and
transfer means coupled to said plug/jack connector means for transferring the primary communication connection of said telephone network from one to the other of said communication apparatus.

31. The system of claim 30 wherein said third connector is connected to said voice communication apparatus.

32. The system of claim 30 wherein said transfer means is coupled to said ancillary equipment apparatus for transferring the primary communication connection from said voice communication apparatus to said ancillary equipment communication apparatus in response to the state of said ancillary equipment communication apparatus.

33. The system of claim 30 wherein said transfer means is coupled to said voice communication apparatus for transferring the primary communication connection from said ancillary equipment communication apparatus to said voice communication apparatus in response to the state of said voice communication apparatus.

34. The system of claim 30 wherein said ancillary equipment communication apparatus comprises a facsimile apparatus for use in transmitting and/or receiving signals representing the information content of a document.

35. A system for providing a combination voice/ancillary equipment capability over the telephone network comprising:
ancillary equipment communication apparatus for use in transmitting and/or receiving ancillary signals;
voice communication apparatus for use in transmitting and/or receiving voice signals;
plug/jack connector means including
a first connector having a first type of connecting means;
a second connector having a second type of connecting means adapted to mate with connecting means of said first type, said second connector being coupled to said first connector and one of said communication apparatus; and
a third connector having said first type of connecting means and adapted to mate with said second connector, said third connector being connected to one of said communication apparatus; and
control means associated with said second connector, said control means responsive to mating of said third connector with said first connector for converting a bridged connection of said one apparatus to the telephone network to a series connection of one said communication apparatus and the other said communication apparatus.

36. The system of claim 35 wherein said control means permits said bridged connection to be reestablished when said first connector and said third connector cease to be mated.

37. The system of claim 36 wherein said control means comprises cover means for covering said connecting means of said second type, said cover means adapted to be moved between a first position covering said connecting means of said second type and a second position exposing said connecting means of said second type.

38. The system of claim 35 further comprising transfer means coupled to said plug/jack connector means for transferring the primary communication connection of said telephone network from one to the other of said communication apparatus.

39. The system of claim 38 wherein said control means enables said transfer means.

40. The system of claim 35 wherein said ancillary equipment communication apparatus comprises facsimile apparatus for use in transmitting and/or receiving signals representing the information content of a document.

41. A system for providing a combination voice/ancillary equipment capability over the telephone network comprising:
ancillary equipment communication apparatus for use in transmitting and/or receiving ancillary signals;
voice communication apparatus for use in transmitting and/or receiving voice signals;
plug/jack connector means including
a first connector having a first type of connecting means;
a second connector having a second type of connecting means adapted to mate with connection means of said first type, said second connector being coupled to said first connector and one of said communication apparatus;
a third connector having said first type of connecting means and adapted to mate with said second connector, said third connector being connected to the other of said communication apparatus; and
transfer means coupled to said plug/jack connector means for transferring the communication connection of said telephone network from one to the other of said communication apparatus.

42. The system of claim 41 wherein said third connector is connected to said voice communication apparatus.

43. The system of claim 41 wherein said transfer means is coupled to said ancillary equipment apparatus for transferring the communication from said voice communication apparatus to said ancillary equipment communication apparatus in response to the state of said ancillary equipment communication apparatus.

44. The system of claim 41 wherein said transfer means is coupled to said voice communication apparatus for transferring the communication connection from said ancillary equipment communication apparatus to said voice communication apparatus in response to the state of said voice communication apparatus.

45. The system of claim 41 wherein said ancillary equipment communication apparatus comprises a facsimile apparatus for use in transmitting and/or receiving signals representing the information content of a document.

* * * * *